United States Patent
Krasilnikov et al.

(10) Patent No.: US 12,407,722 B1
(45) Date of Patent: Sep. 2, 2025

(54) ISOLATING RESOURCES FOR POTENTIALLY FRAUDULENT VIRTUAL COMPUTE INSTANCES

(71) Applicant: Amazon Technologies, Inc., Seattle, WA (US)

(72) Inventors: Nikolay Krasilnikov, Seattle, WA (US); Guy Sebastian Parton, Cape Town (ZA); James Gowans, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 479 days.

(21) Appl. No.: 17/217,998

(22) Filed: Mar. 30, 2021

(51) Int. Cl.
*H04L 9/40* (2022.01)
*G06F 9/455* (2018.01)
*G06F 9/50* (2006.01)

(52) U.S. Cl.
CPC ...... *H04L 63/1483* (2013.01); *G06F 9/45558* (2013.01); *G06F 9/5077* (2013.01); *H04L 63/1416* (2013.01); *G06F 2009/45587* (2013.01); *G06F 2009/45591* (2013.01)

(58) Field of Classification Search
CPC ............. H04L 63/1483; H04L 63/1416; G06F 9/45558; G06F 9/5077; G06F 2009/45587; G06F 2009/45591
See application file for complete search history.

(56) References Cited

U.S. PATENT DOCUMENTS

| | | | |
|---|---|---|---|
| 9,286,731 B2* | 3/2016 | Hamilton, II | G06T 19/20 |
| 9,497,224 B2 | 11/2016 | Sweet et al. | |
| 9,727,847 B2* | 8/2017 | Kurabayashi | H04L 47/70 |
| 9,942,250 B2* | 4/2018 | Stiansen | H04L 63/1416 |
| 10,049,209 B2* | 8/2018 | Turgeman | G06F 3/041 |
| 10,346,550 B1* | 7/2019 | Botta | G06F 16/2228 |
| 10,365,950 B2* | 7/2019 | Ditto | G06F 11/1484 |
| 10,887,307 B1* | 1/2021 | Newstadt | H04L 63/102 |
| 11,461,149 B1* | 10/2022 | Quinn | G06F 9/45558 |
| 11,494,214 B2* | 11/2022 | Liguori | G06F 21/57 |
| 2010/0251329 A1* | 9/2010 | Wei | H04L 67/1001 726/1 |
| 2011/0179176 A1* | 7/2011 | Ravichandran | G06Q 30/02 709/226 |
| 2013/0145469 A1* | 6/2013 | Kulkarni | G06F 21/84 726/24 |
| 2013/0212709 A1* | 8/2013 | Tucker | G06F 21/55 726/29 |
| 2013/0238804 A1* | 9/2013 | Tanino | G06F 9/4856 709/226 |
| 2014/0047439 A1* | 2/2014 | Levy | H04L 41/0895 718/1 |

(Continued)

*Primary Examiner* — Dereena T Cattungal
(74) *Attorney, Agent, or Firm* — S. Scott Foster; Kowert, Hood, Munyon, Rankin & Goetzel, P.C.

(57) ABSTRACT

Resources may be isolated for potentially fraudulent virtual compute instances. Resource utilization of virtual compute instances at a host system may be monitored. A virtual compute instance may be identified for fraud mitigation based on the monitored resource utilization. Availability of hardware resources to the identified virtual compute instance may be modified, whereas the availability of the hardware resources may remain for other virtual compute instances not identified for fraud mitigation.

20 Claims, 11 Drawing Sheets

(56) References Cited

U.S. PATENT DOCUMENTS

| | | | | |
|---|---|---|---|---|
| 2015/0095485 | A1* | 4/2015 | Alatorre | H04L 47/125 |
| | | | | 709/224 |
| 2015/0096025 | A1* | 4/2015 | Ismael | G06F 21/566 |
| | | | | 726/23 |
| 2016/0164894 | A1* | 6/2016 | Zeitlin | H04L 63/1416 |
| | | | | 726/23 |
| 2016/0205007 | A1* | 7/2016 | Syed | H04L 43/062 |
| | | | | 709/224 |
| 2016/0232024 | A1* | 8/2016 | Hamilton, II | G06F 21/53 |
| 2016/0380865 | A1* | 12/2016 | Dubal | H04L 43/026 |
| | | | | 709/224 |
| 2018/0288091 | A1* | 10/2018 | Doron | H04L 63/1458 |
| 2018/0336351 | A1* | 11/2018 | Jeffries | G06F 21/577 |
| 2019/0097971 | A1* | 3/2019 | Coleman | H04L 63/0281 |
| 2019/0158497 | A1* | 5/2019 | Diaz Cuellar | H04L 63/108 |
| 2019/0182673 | A1* | 6/2019 | Hilbuch | H04L 67/10 |
| 2019/0220863 | A1 | 7/2019 | Novick et al. | |
| 2020/0104153 | A1* | 4/2020 | Shibayama | G06F 3/0631 |
| 2020/0244674 | A1* | 7/2020 | Arzani | G06N 20/00 |
| 2020/0380130 | A1* | 12/2020 | Purushotham | G06F 21/566 |
| 2021/0026949 | A1* | 1/2021 | Korotaev | G06F 21/577 |

* cited by examiner

ISOLATING RESOURCES FOR POTENTIALLY FRAUDULENT VIRTUAL COMPUTE INSTANCES

BACKGROUND

The advent of virtualization technologies for commodity hardware has provided benefits with respect to managing computing resources for many clients with diverse needs, allowing various computing resources to be efficiently and securely shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines.

Figure 1:
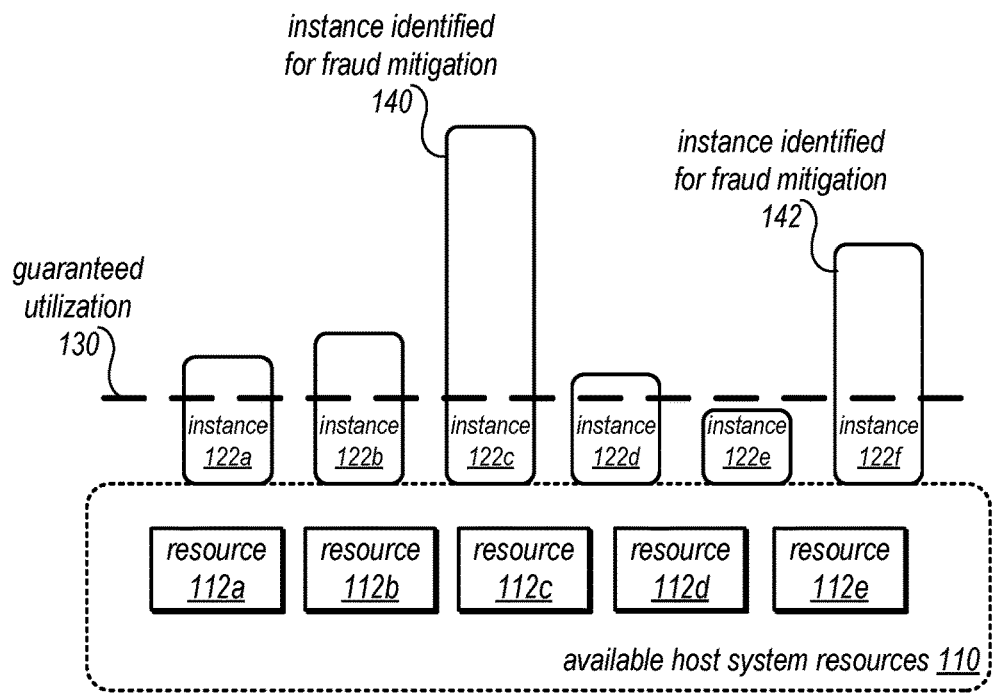
FIG. 1 is a logical block diagram illustrating isolating resources for potentially fraudulent virtual compute instances, according to some embodiments.
Figure 1:
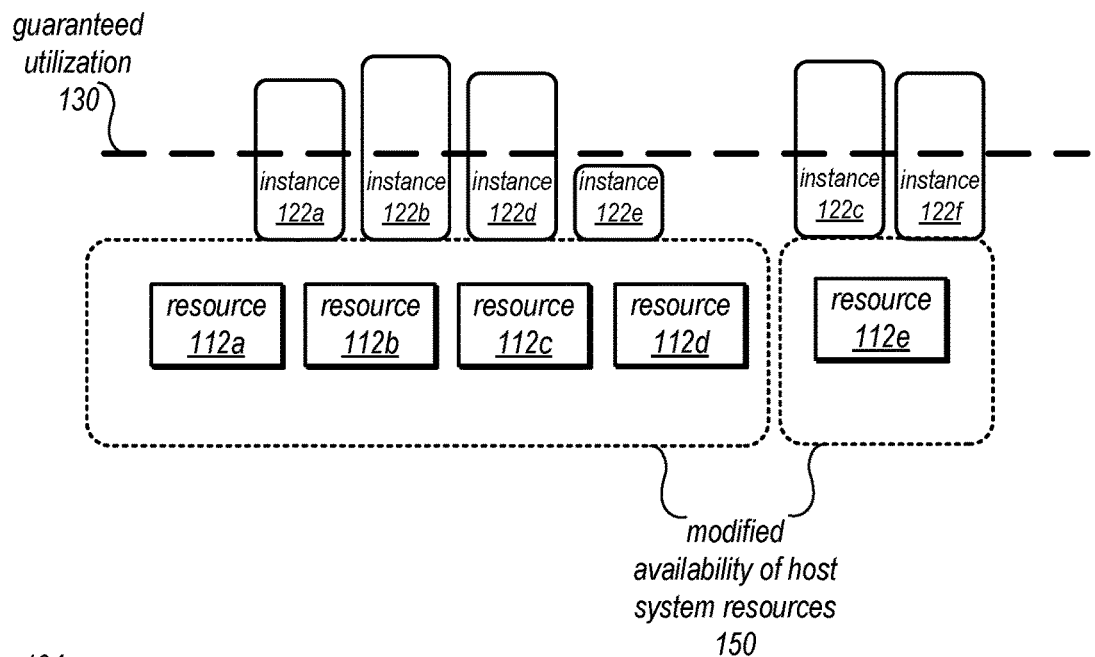

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various techniques for isolating resources for potentially fraudulent virtual compute instances are described herein. A virtual computing service may supply clients, operators, or other customers with access to and/or control of one or more virtual computing resources. These resources may include various types of computing systems or devices configured for communication over a network. For example, in some embodiments, a virtual computing service may provide virtual computing resources to clients, users, or other type of customers, in the form of virtual compute instances (e.g., a virtual machine acting as a distinct logical computing system that provides users with the illusion that they are the sole operators and administrators of a given hardware computing resource). Users of virtual computing service may obtain, access, or otherwise use virtual compute instances to perform various functions, services, techniques, and/or applications.

In some scenarios, fraudulent use of virtual compute instances may occur. For example, user accounts that do not take responsibility (e.g., either financially in paying for usage or for the effects of using the virtual compute instances, such as malicious behavior) may fraudulently use virtual compute instances in violation of terms of service or other agreements for utilizing virtual compute instances offered by a service or other distributed system. As services, like virtual computing service 210 or other distributed systems, may rely upon techniques that over-subscribe virtual compute instance placements in order to efficiently utilize power, hardware, and other resources (e.g., eliminating environmental waste by unnecessarily adding further resources, wasting costs to execute or support underutilized resources, etc.). For example, over-subscription techniques may place more instances on a given host system than that host system could support if a large portion of the instances were to use their guaranteed allocation of resources at the same or overlapping times. Such utilization scenarios are unlikely (e.g., different applications utilize different amounts of resources at different times), allowing for host systems for virtual compute instances to be over-subscribed while still providing guaranteed (or greater) performance for hosted virtual compute instances.

Fraudulent use of instances, however, makes maintaining an over-subscription placement strategy challenging. For instance, fraudulent use of virtual compute instances may exhibit high resource utilization patterns (as cost or other incentive structures do not encourage a fraudulent user to limit usage) which can impact the performance of other host virtual compute instances on an over-subscribed host, by reducing the availability of hardware resources (e.g., processor, memory, network bandwidth, etc.,) that would otherwise be available because there is little time when that virtual compute instance is not trying to utilize as many resources as possible.

Techniques for isolating resources for potentially fraudulent virtual compute instances may be implemented in various embodiments in order to limit the impact of virtual compute instances likely to be under fraudulent use, while still not violating the terms of service, service-level agreements (SLAs) or other guaranteed utilization for those virtual compute instances. In this way, in the event a virtual compute instance is mistakenly identified for fraud mitigation, that specific instance would still receive the guaranteed performance provide, while other instances would not suffer from the effects of high utilization that may impact the other instances' performance on an over-subscribed host in the event that instance does prove to be fraudulently used.

FIG. 1 is a logical block diagram illustrating isolating resources for potentially fraudulent virtual compute instances, according to some embodiments. As illustrated in scene 102, available host system resources 110, including resources 112a, 112b, 112c, 112d, and 112e may support various different instances executing on a host, including instances 122a, 122b, 122c, 122d, 122e, and 122f. Guaranteed utilization 130 may represent the guaranteed utilization each instance may receive and the individual bars of each instance may represent differing levels of actual utilization of resources 110 by the instances 112. As indicated at 140 and 142, instances 122c and 122f may be identified for fraud mitigation (e.g., according to the various techniques discussed below with regard to FIGS. 3-8). For example, various utilization patterns of one (or more) hardware resources, like processor utilization may indicate fraudulent use. Identifying instances 122c and 122f for fraud mitigation may trigger a modification to available host system resources, as illustrated in scene 104.

For example, modified availability of host system resources 150 may show that instances 122c and 122f have availability of host system resources limited to resource 112e, while other resources 112a-112d may be utilized amongst the other instances (e.g., 122a, 122b, 122d, and 122e). Isolating or otherwise modifying resource availability of resources for subsequent execution of virtual compute instances identified for fraud mitigation in this way may still allow instances 122c and 122f to have at or above guaranteed utilization 130, while allowing for greater utilization of other instances, as illustrated in scene 104. For instance, instead of five resources 112 divided six ways, four instances may utilize four resources (122a, 122b, 122d, and 122e sharing resources 112a-112d), and two resources may share one resource (122c and 122f sharing resource 112e).

Please note that previous descriptions are not intended to be limiting, but are merely provided as an example of virtual compute instances and host system resources. For example, different numbers of host systems, different or other management components, such as a control plane discussed in FIG. 2, or other features may be implemented as part of isolating resources for potentially fraudulent virtual compute instances.

The specification next includes a general description of a provider network, which may perform isolating resources for potentially fraudulent virtual compute instances. Then various examples of a provider network are discussed, including different components/modules, or arrangements of components/module that may be employed as part of implementing a provider network. A number of different methods and techniques to implement isolating resources for potentially fraudulent virtual compute instances are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
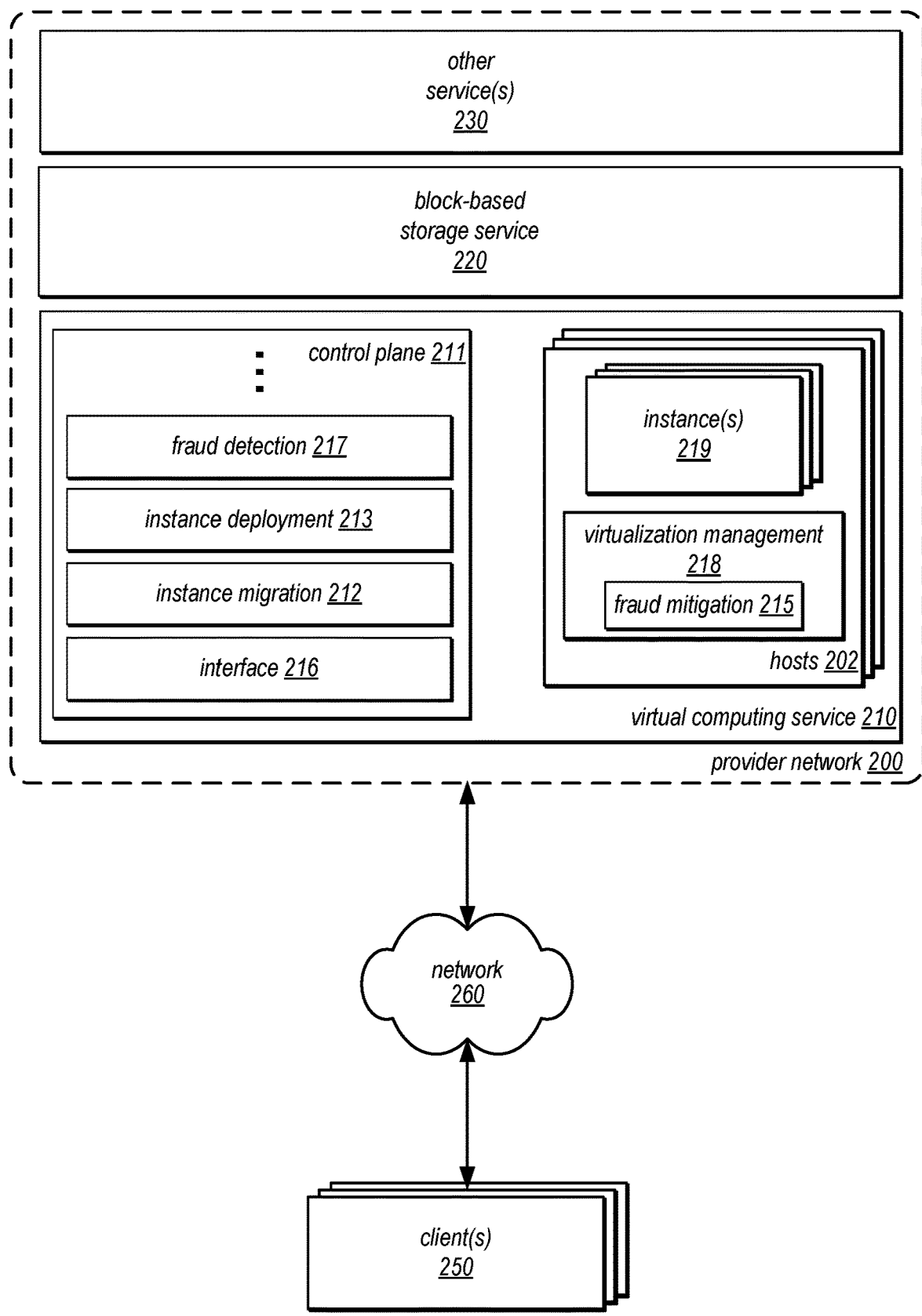
FIG. 2 is a logical block diagram illustrating a provider network that implements different services including a virtual computing service that implements isolating resources for potentially fraudulent virtual compute instances, according to some embodiments.

FIG. 2 is a logical block diagram illustrating a provider network that implements different services including a virtual computing service that implements isolating resources for potentially fraudulent virtual compute instances, according to some embodiments. A provider network 200 (which may, in some implementations, be referred to as a "cloud provider network" or simply as a "cloud") refers to a pool of network-accessible computing resources (such as compute, storage, and networking resources, applications, and services), which may be virtualized or bare-metal. The provider network 200 can provide convenient, on-demand network access to a shared pool of configurable computing resources that can be programmatically provisioned and released in response to customer commands. These resources can be dynamically provisioned and reconfigured to adjust to variable load.

The provider network 200 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network 200 via a publicly accessible network (e.g., the Internet, a cellular communication network). Regions are connected to a global network which includes private networking infrastructure (e.g., fiber connections controlled by the cloud provider) connecting each region to at least one other region. The provider network 200 may deliver content from points of presence outside of, but networked with, these regions by way of edge locations and regional edge cache servers. An edge location can be an extension of the cloud provider network outside of the traditional region/AZ context. For example an edge location can be a data center positioned to provide capacity to a set of customers within a certain latency requirement, a set of servers provided to a customer's premises, or a set of servers provided within (or forming part of) a cellular communications network, each of which can be controlled at least in part by the control plane of a nearby AZ or region. This compartmentalization and geographic distribution of computing hardware enables the provider network 200 to provide low-latency resource access to customers on a global scale with a high degree of fault tolerance and stability.

As noted above, provider network 210 may implement various computing resources or services, such as a virtual compute service 210, block-based storage service 220, and other service(s) 230 which may be any other type of network based services, including various other types of storage (e.g., database service or an object storage service), data processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

Virtual computing service 210 may be implemented by provider network 200, in some embodiments. Virtual computing service 210 may offer virtualized computing resources (e.g., virtual compute instances) and according to various configurations for client(s) 250 operation. For example, various host systems 202 (e.g., computing system 1000 in FIG. 9), which may offer different capabilities and features for hosted virtual computes instances, may serve as hosts for one or more virtual compute instance(s) 219. Hosts 202 may implement virtualization management 218 to support and/or otherwise provide the execution framework to host instances and may include, for example, various different hypervisors or other virtualization software, firmware, and/or hardware that can host virtual compute instances (e.g., virtual machines). Virtualization management 218 may implement the workflows, tasks, or other operations to handle virtual compute instance management requests, including, but not limited to start, stop, pause, and resume.

In various embodiments, virtual compute instance(s) 219 may be implemented with a specified computational capacity (which may be specified by indicating the type and number of CPUs, the main memory size, and so on) and a specified software stack (e.g., a particular version of an operating system, which may in turn run on top of a hypervisor). Hosts 202 may be a number of different types of computing devices, used singly or in combination, to host the virtual compute instances 219, including general purpose or special purpose computer servers, storage devices, network devices and the like. In some embodiments client(s) 250 or other any other user may be configured (and/or authorized) to direct network traffic to a virtual compute instance 219.

Virtual compute instances 219 may operate or implement a variety of different frameworks, such as application server instances, general purpose or special-purpose operating systems, platforms that support various interpreted or compiled programming languages such as Ruby, Perl, Python, C, C++ and the like, or high-performance computing platforms) suitable for performing client(s) 250 applications, without, for example, requiring the client(s) 250 to access an instance. Applications (or other software operated/implemented by a virtual compute instance 219 and may be specified by client(s), such as custom and/or off-the-shelf software.

In some embodiments, virtual compute instances 219 may have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a virtual compute instance 219 for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires a virtual compute instance 219 to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances 219, with a corresponding pricing policy, may be supported in some embodiments as well, where the upfront costs and the per-hour costs fall between the corresponding High Uptime Ratio and Low Uptime Ratio costs.

Virtual compute instance configurations may also include virtual compute instances 219 with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of virtual compute instances 219 may also include their location, in a particular data center, availability zone, geographic region, etc., and (in the case of reserved compute instances) reservation term length.

Virtual computing service 210 may implement control plane 211, which may include various features to manage hosts 202 and instance(s) 219 on behalf of client(s) 250, in some embodiments. For example, control plane 211 may implement various performance monitoring features to ensure performance guarantees for instance(s) 219, such as those specified by Service Level Agreements (SLAs) are met. Control plane 211 may also implement a management interface 216, which may support various operations to configure or enable features, launch, deploy, start, stop, pause, resume, or other controls for instance(s) 219. Control plane 211 may implement various workflows or invoke various micro-services (not illustrated). Control plane 211 may also support various features related to isolating resources for potentially fraudulent virtual compute instances, according to some embodiments, such as fraud detection 217, instance deployment 213, and instance migration 212, as discussed in detail below with regard to FIGS. 3-8.

Interface 216 may include various types of interfaces, such as a command line interface, graphical user interface, and/or programmatic interface (e.g., Application Programming Interfaces (APIs)) in order to perform requested operations. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

Provider network 200 may also implement block-based storage service 220, in various embodiments, for performing storage operations. Block-based storage service 220 may be a storage system that provides block level storage for storing one or more sets of data volumes of data that may be mapped to particular clients (e.g., a virtual compute instance(s) 219 of virtual compute service 210), providing virtual block-based storage (e.g., hard disk storage or other persistent storage) as a contiguous set of logical blocks. In some embodiments, block-based storage service may store data, such as in-memory state for instance(s) as part of migrating an instance.

Generally speaking, clients 250 may encompass any type of client configurable to submit network-based requests to provider network 200 via network 260, including requests for storage services (e.g., a request to create a replication job in migration service 230, etc.). For example, a given client 250 may include a suitable version of a web browser, or may include a plug-in module or other type of code module that may execute as an extension to or within an execution environment provided by a web browser. Alternatively, a client 250 may encompass an application (or user interface thereof), a media application, an office application or any other application that may make use of resources in provider network 200 to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that may interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on a data storage service (e.g., a block-based storage service 220). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service may be coordinated by client 250 and the operating system or file system on behalf of applications executing within the operating system environment.

Clients 250 may convey network-based services requests to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

In some embodiments, provider network 200 may include the hardware (e.g., modems, routers, switches, load balancers, proxy servers, etc.) and software (e.g., protocol stacks, accounting software, firewall/security software, etc.) necessary to establish a networking links between different components of provider network 200, such as virtualization hosts, control plane components as well as external networks 260 (e.g., the Internet). In some embodiments, provider network 200 may employ an Internet Protocol (IP) tunneling technology to provide an overlay network via which encapsulated packets may be passed through the internal network using tunnels. The IP tunneling technology may provide a mapping and encapsulating system for creating an overlay network and may provide a separate namespace for the overlay layer and the internal network layer. Packets in the overlay layer may be checked against a mapping directory to determine what their tunnel target should be. The IP tunneling technology provides a virtual network topology; the interfaces that are presented to clients 250 may be attached to the overlay network so that when a client 250 provides an IP address that they want to send packets to, the IP address is run in virtual space by communicating with a mapping service that knows where the IP overlay addresses are.

Figure 3:
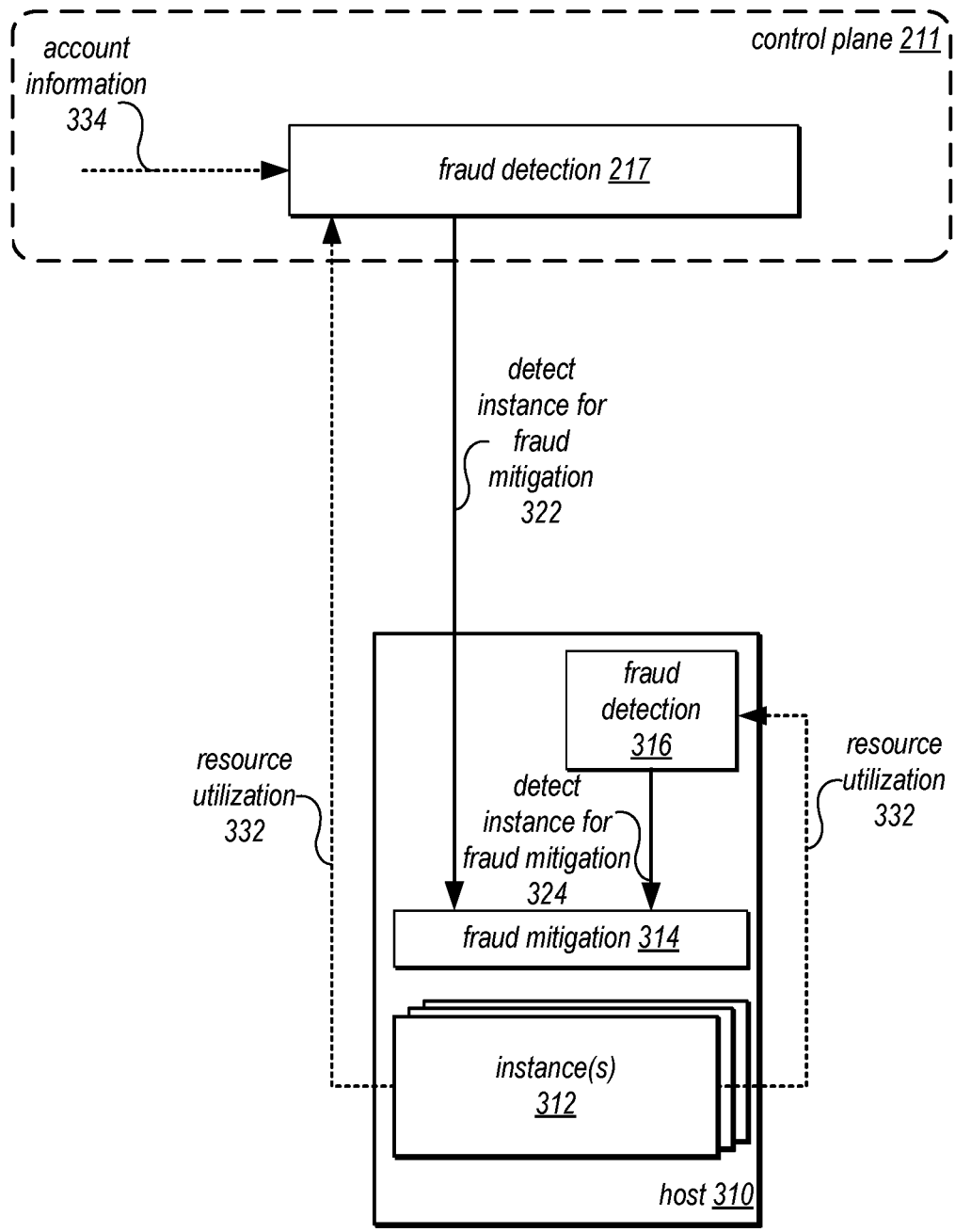
FIG. 3 is a logical block diagram illustrating different indications for identifying instances for fraud mitigation, according to some embodiments.

FIG. 3 is a logical block diagram illustrating different indications for identifying instances for fraud mitigation, according to some embodiments. Detection of instances for fraud mitigation may occur in different locations and using different techniques. In some embodiments, control plane 211 may implement fraud detection 217 which may evaluate resource utilization 332 of instances 312 on host 310 and/or account information 334 to detect instances for fraud mitigation. For detected instances, fraud detection 217 may send an indication to fraud mitigation 314, which may perform various mitigation techniques as discussed below with regard to FIG. 4.

Other information that would not necessarily be available to a host system may be utilized to identify instances for fraud mitigation at fraud detection 217. For example, account information 334 or other information indicative of fraudulent use (e.g., a similar usage pattern on other virtual compute instances executing on other host systems for the same account, account financial or historical information indicating higher probability of fraud, etc.) may be used to identify a virtual compute instance for fraud mitigation. Fraud detection 217 may monitor resource utilization of instances 332 across one or multiple hardware resources (e.g., processor, network, memory, I/O, etc.) to detect fraudulent behavior. Fraud behavior profiles or other criteria may be applied by fraud detection 217 which indicate, based on resource utilization measurements, those instances likely to be executing on behalf of fraudulent users. For instance, behavior profiles for certain activities related to fraud, such as crypto-currency mining or high volume communication operations (e.g., generating and/or sending spam), among other activities or usage of virtual compute instances indicative of fraud may be used to evaluate virtual compute instances for fraud mitigation.

Machine learning-based techniques which may apply various machine learning models trained to evaluate instance behavior to indicate likely fraudulent activity may be applied. Machine learning refers to a discipline by which computer systems can be trained to recognize patterns through repeated exposure to training data. In unsupervised learning, a self-organizing algorithm learns previously unknown patterns in a data set without any provided labels. In supervised learning, this training data includes an input that is labeled (either automatically, or by a human annotator) with a "ground truth" of the output that corresponds to the input. A portion of the training data set is typically held out of the training process for purposes of evaluating/validating performance of the trained model. The use of a trained model in production is often referred to as "inference," during which the model receives new data that was not in its training data set and provides an output based on its learned parameters. The training and validation process may be repeated periodically or intermittently, by using new training data to refine previously learned parameters of a production model and deploy a new production model for inference, in order to mitigate degradation of model accuracy over time.

Host 310 may implement fraud detection 316 which may implement similar fraud detection techniques to that of fraud detection 217 (or different ones) based on resource utilization 332 or other locally available information, in some embodiments. For example, fraud detection 326 may monitor resource utilization of instances 332 across one or multiple hardware resources (e.g., processor, network, memory, I/O, etc.) to detect fraudulent behavior. Fraud behavior profiles or other criteria, like those discussed above may be applied which indicate, based on resource utilization measurements, those instances likely to be executing on behalf of fraudulent users. Fraud detection 326 may also consider or use the frequency of interference or conflicts for resources caused by one instance with respect to other instances on the same host system. If, for example, one instance has a higher conflict rate for processors with other virtual instances (e.g., greater than some threshold amount), then such conflict information may be indicative of fraudulent use. For instances identified for fraud mitigation, fraud detection 316 may send an indication to fraud mitigation 314.

Figure 4:
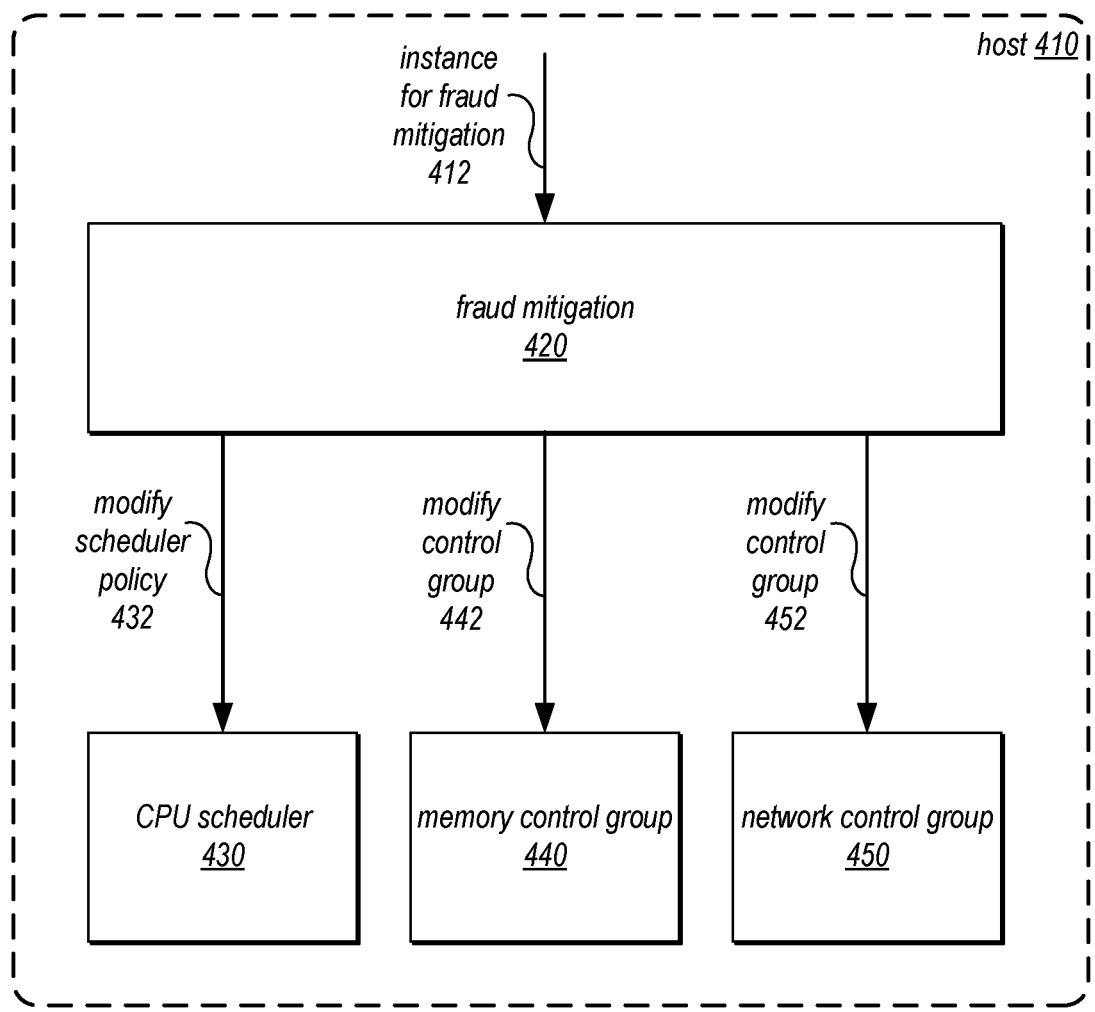
FIG. 4 is a logical block diagram illustrating fraud mitigation on a host system, according to some embodiments.

FIG. 4 is a logical block diagram illustrating fraud mitigation on a host system, according to some embodiments. Different techniques for mitigating the impact of fraudulent use on other virtual compute instances may be implemented. For example, fraud mitigation 420 implemented as part of a host system 410 (e.g., similar to hosts systems 310 and 219) may receive indications 412 of instances identified for fraud mitigation (e.g., from host-based fraud detection or control plane-based fraud detection as discussed above with regard to FIG. 3). Fraud mitigation 420 may determine which and how much mitigation should be applied to hardware resources, such as processor, memory, network bandwidth, or others. For example, in some embodiments, different fraud mitigation escalations may be performed according to a scale of mitigation strength (e.g., reducing one, then two, then three types of hardware, and/or reducing the amount of available hardware). Position on the mitigation strength scale may be determined using a confidence value for identifying a virtual compute instance for fraud (e.g., where less confident instances have weaker mitigation applied and more confident instances have stronger mitigation applied). In some embodiments, a default mitigation action (e.g., processor pinning) or other information mapping fraud detection to mitigation actions for one or multiple resources (e.g., lowering available of memory and network to predefined amounts) may be performed instead of using a scale of mitigation strength.

As indicated at 432, a modification to a scheduler policy may be made for CPU scheduler 430. CPU scheduler 430 may be an operating system scheduler or other scheduler implemented as part of virtualization management 218 in FIG. 2. Different scheduling features, for instance, may be distributed across different components (e.g., a load balancing scheduler that arbitrates between instances on a host, a scheduler that balances between different threads or processes, etc.). Different scheduler policies may be modified according to the particular scheduler component being used to implemented mitigation.

Figure 5A:
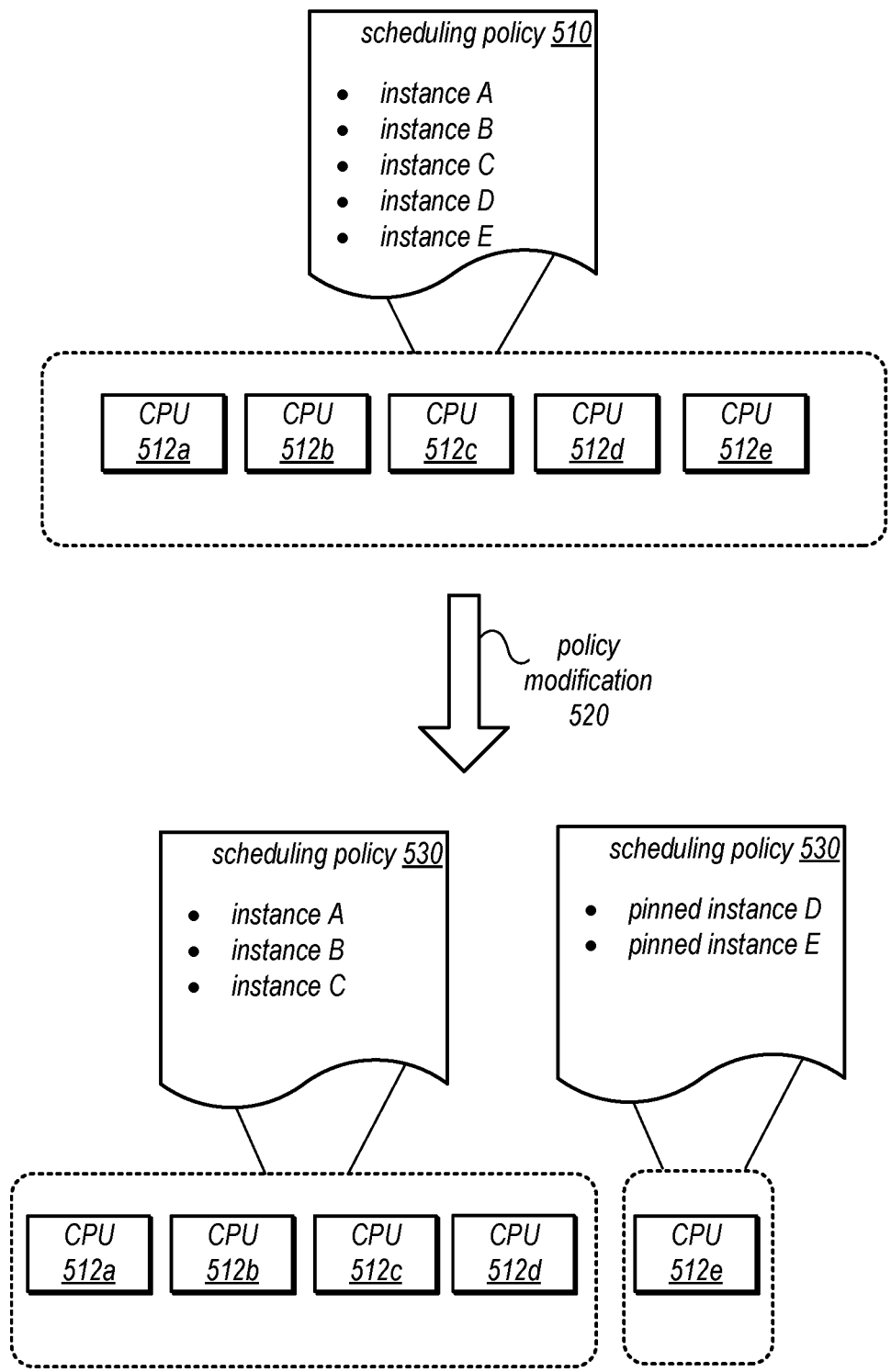
FIGS. 5A-5B is a logical block diagrams illustrating example resource availability modifications, according to some embodiments.

As illustrated in FIG. 5A, scheduling policy 510 may allow for instances A, B, C, D, and E to utilize as needed CPUs 512a, 512b, 512c, 512d, and 512e. Policy modification 520, however, may result in a modified scheduling policy 530 with two different aspects. In one aspect, policy 530 may allow instances A, B, and C, to utilize any of CPUs 512a-512d. For instances identified for fraud mitigation, such as instances D and E, the scheduling policy 530 may pin these instances to a single CPU 512e. In this way, instance D and E may still share CPU 512 (which may meet guaranteed performance), but will isolate the effects of any utilization of instances D and E to CPU 512e, minimizing conflicts with instances A, B, and C on CPUs 512a-512d.

Figure 5B:
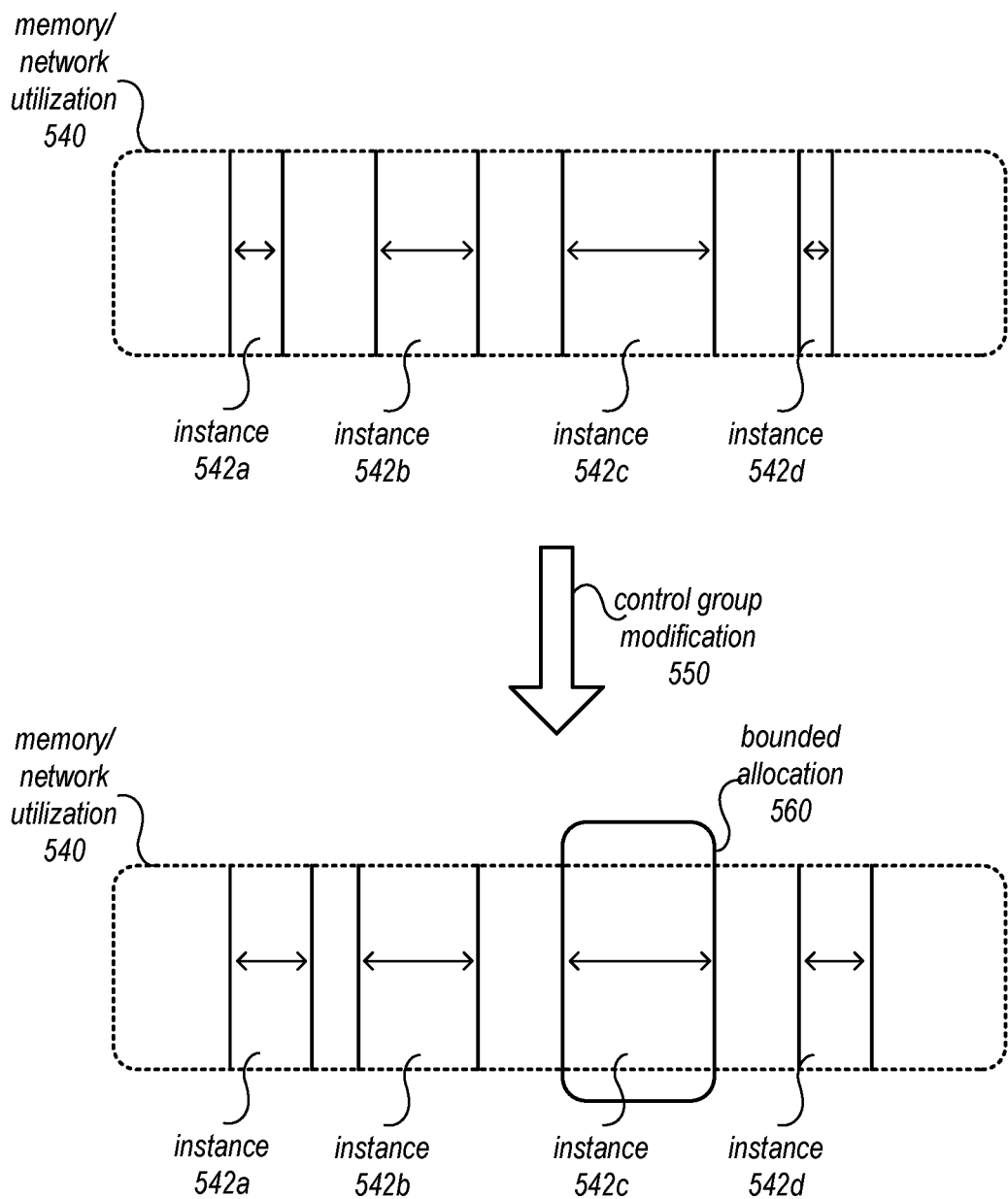

Control groups may be utilized, in some embodiments to modify resource availability. For example, as indicated at 442 modifications to a control group for memory 440 may be made. Likewise, modifications 452 to a control group for network may be made. FIG. 5B illustrates an example of control group modifications, according to some embodiments. Memory or network bandwidth utilization represented at 540 may allow for different instances, such as instances 542a, 542b, 542c, and 542d to utilize the resource as needed. A control modification, as indicated at 550, may change availability of a resource for an instance identified for fraud mitigation, such as instance 542c. A bounded allocation 560 may limit the expansion of instance 542c utilization (whereas other instances may be unbounded, as indicated in memory network utilization 540.

Figure 6A:
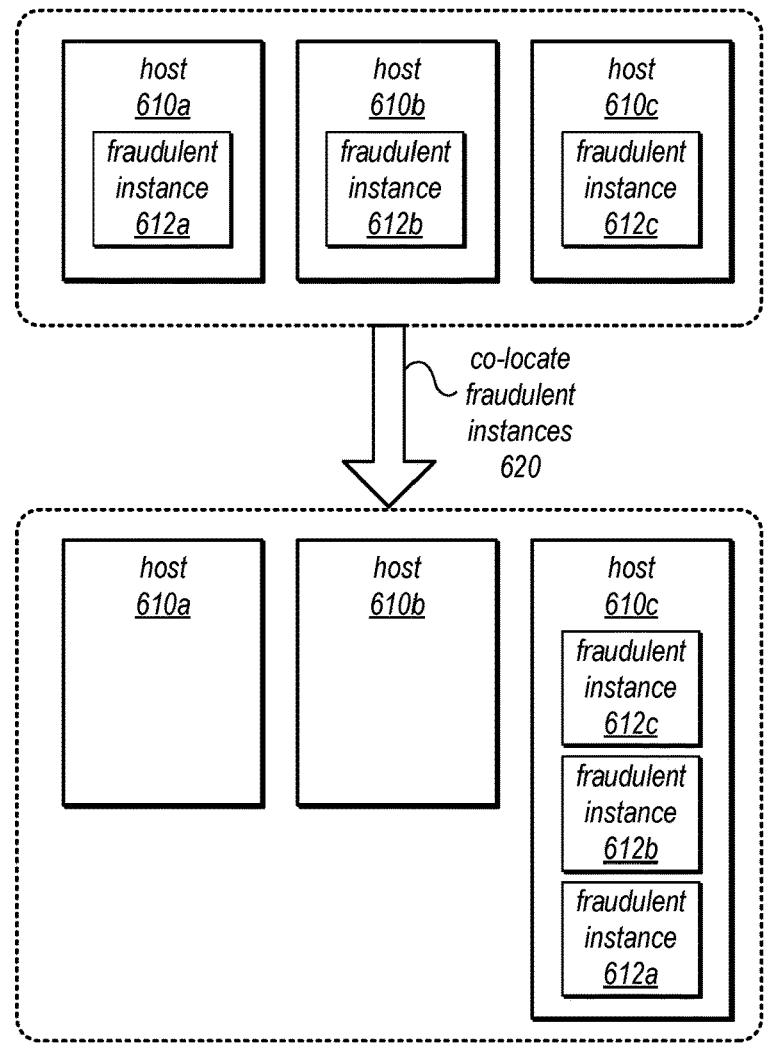
FIGS. 6A-6C are logical block diagrams illustrating migrations and deployments to co-locate instances for fraud mitigation, according to some embodiments.
Figure 6B:
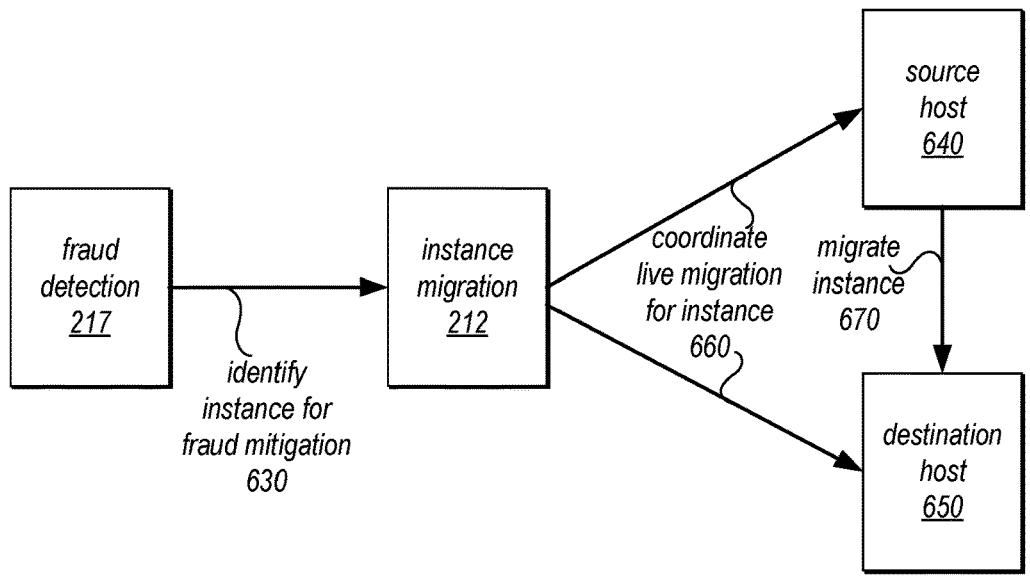
Figure 6C:
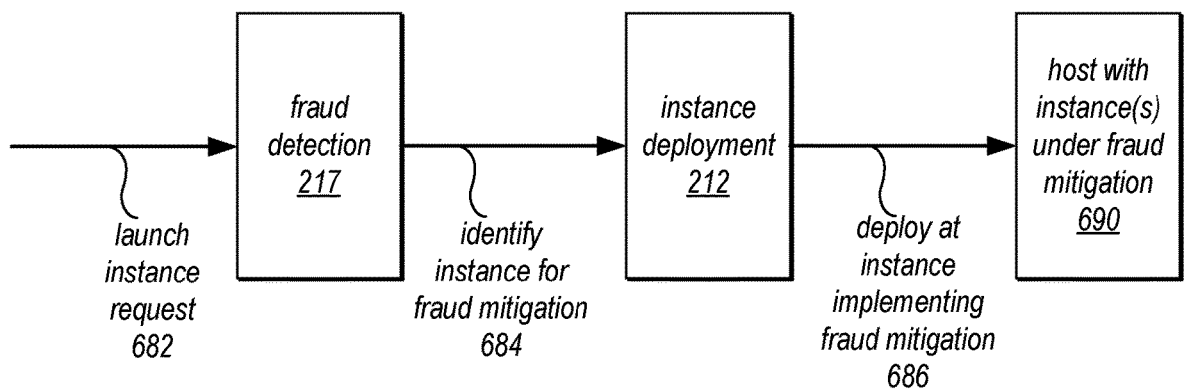

FIGS. 6A-6C are logical block diagrams illustrating migrations to co-locate instances for fraud mitigation, according to some embodiments. For large scale services (or other large distributed systems), the performance disruptions avoided to instances not identified for fraud mitigation may be further enhanced by co-locating fraudulent instances together on a host system. In this way, fraudulent instances can still receive their guaranteed performance but make more efficient use of changes in resource allocation to modify availability. For example, grouping two fraudulent instances together on a same processor may reduce the impact of potential fraud from two to one hosts, exposing less instances to potentially fraudulent impacts on resource consumption.

In FIG. 6A, fraudulent instances 612a, 612b, and 612c may be spread across different respective hosts, 610a, 610b, and 610c. Techniques to co-locate fraudulent instances, as indicated at 620, may result in a single host 610c that hosts fraudulent instances 612a, 612b, and 612c. This may allow for a control plane to better predict resource utilization for a host 610c, as well as other hosts 610a and 610b. For example, if over-subscription deployment techniques are utilized to place virtual compute instances, relying upon the likelihood that all instances on a host do not utilize all of their guaranteed resources at a same time, a host can support more instances than it would if it had to place no more resources than it could on the host if all instances were utilizing 100% of guaranteed resources most of the time. Because fraudulent instances are likely to exhibit this high utilization behavior, co-locating the instances will allow for the control plane not to over-subscribe (or over-subscribe less) the host with fraudulent instances (e.g., host 610*c*). In this way, optimal placement decisions on hosts can be made that will satisfy the resource utilization of virtual compute instances, whether identified for fraud mitigation or not.

In FIG. 6B, a technique for migrating virtual compute instances identified for fraud mitigation is illustrated. Fraud detection 217 of control plane 211 may indicate or otherwise identify an instance for fraud mitigation 630 to instance migration 212 (e.g., according to the various techniques for identifying such instances discussed above as well as below). Instance migration 212 may then begin a migration operation, coordinating, as indicated at 660, to move the virtual compute instance form source host 640 to destination host 650.

For example, instance migration 212 may identify destination host 650 (e.g., by checking state information for hosts to identify a host with other virtual compute instance(s) with fraud mitigation (e.g., below a threshold limit), send a request to destination host 650 to confirm acceptance of a new virtual compute instance identified for fraud mitigation, and, if accepted, inform source host 640 of the destination host 650 to which an instance will be migrated. Various migration techniques 670 may be implemented, in different embodiments. For example, live migration may utilize various data transfer techniques, including various memory data, including application state (e.g., processor/thread stage) so that when the location of the first virtual compute instance switches to the second host system, any downtime will be imperceptible to a user of the first virtual instance as execution of the first virtual compute instance will continue, thus appearing as the instance were always "live" during the migration. In other embodiments, other migration techniques may be implemented (e.g., non-live migration) to co-locate the first virtual compute instance to the second host system, as long as those migration techniques do not violate a terms of service or other service level agreement enforced for the first virtual compute instance.

Co-location of instances identified for fraud mitigation may occur before migration would need to be performed, in some embodiments. For example, as illustrated in FIG. 6C, a launch instance request 682 may be received at a virtual computing service 210. The launch instance request 682 may be analyzed by fraud detection 217 as part of control plane 211 handling of the launch instance request 682. Fraud detection 217 may apply fraud detection criteria for a new instance that has not yet executed (and thus may not already exhibit behaviors indicative of fraud). For example, fraud detection 217 may determine whether other instances currently executing for a same account also associated with launch instance request 682 have been identified for fraud mitigation. If so, then fraud detection 217 may identify the new instance for fraud mitigation. Other patterns, profiles or information may be considered for potential fraud mitigation, such as the number or frequency at which instances have been launched for the account (e.g., a large number of instances launched for an account and/or a number of instances launched within a small period of time).

As indicated at 684, fraud detection 217 may identify the instance to be launched for fraud mitigation to instance deployment 212. Instance deployment 212 may determine a placement location for the instance and direct the deployment of the instance at the determined placement location. Instance deployment 212 may be able access metadata or other information descriptive of host systems for virtual computing service 210 to identify one (or more) host systems that current host a virtual compute instance under fraud mitigation. One of those host systems, such as host 690, may be selected and instance deployment 212 may then direct deployment 686 at host 690 for the instance. Similar to fraud mitigation signals 322 in FIG. 3 discussed above, the deployment 686 of the instance at host 690 may include an indication or request to employ fraud mitigation for the instance at host 690. In some embodiments, host system 690 may wait to place the instance under fraud mitigation until local fraud detection at host system (e.g., as discussed above with regard to FIG. 3 at 316) identifies the instance for fraud mitigation.

Figure 7:
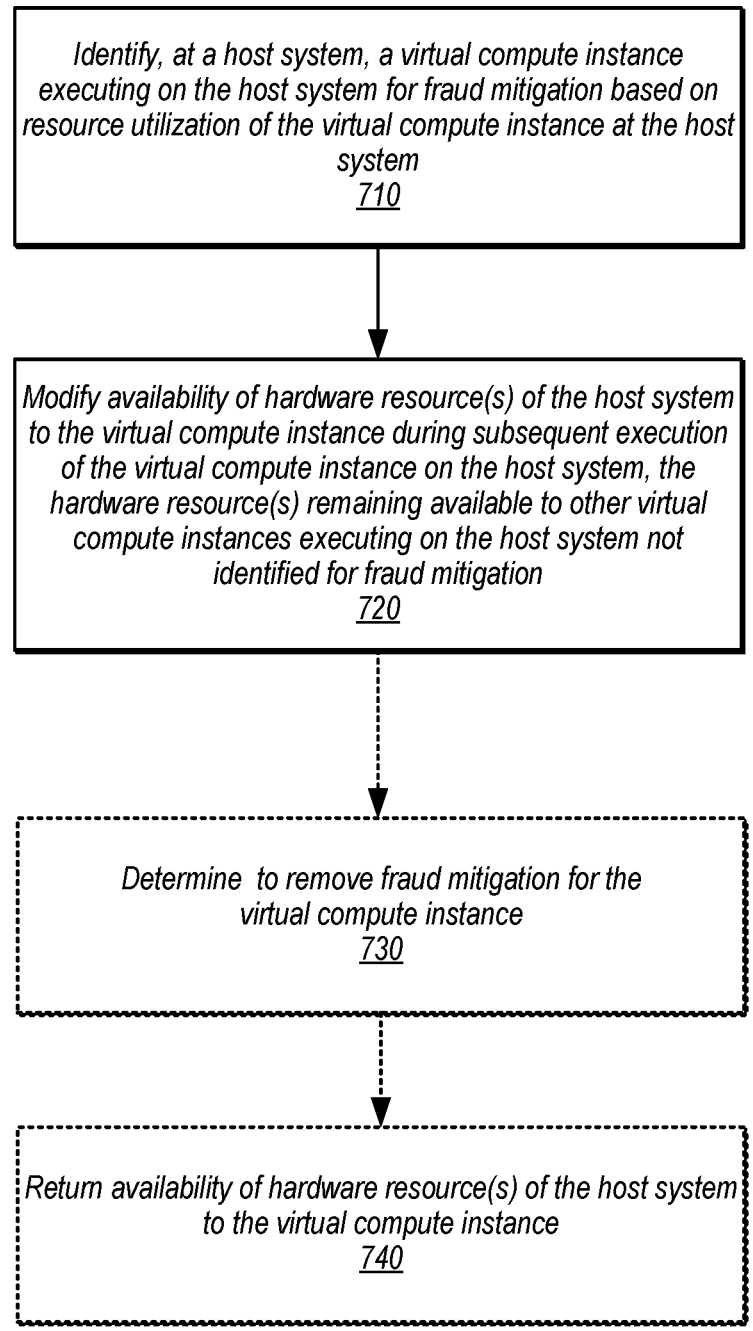
FIG. 7 is a high-level flowchart illustrating techniques and methods to implement isolating resources for potentially fraudulent virtual compute instances, according to some embodiments.

The examples of isolating resources for potentially fraudulent virtual compute instances, according to some embodiments discussed above with regard to FIGS. 2-6C have been given in regard to one example of a provider network and virtual computing service. Various other types of virtual compute instances and virtual computing services (e.g., with different control plane implementations) may implement these techniques. FIG. 7 is a high-level flowchart illustrating techniques and methods to implement isolating resources for potentially fraudulent virtual compute instances, according to some embodiments. These techniques, as well as the techniques of FIG. 8 described below, may be implemented using various components of a provider network as described above with regard to FIGS. 2-6C or other types or systems implementing a provider network.

As indicated at 710, a virtual compute instance executing on a host system may be identified for fraud mitigation based on resource utilization of the virtual compute instance, in some embodiments. For example, a host system may implement fraud detection, as discussed above with regard to FIG. 3, which may monitor resource utilization of instances across one or multiple hardware resources (e.g., processor, network, memory, I/O, etc.) to detect fraudulent behavior. Fraud behavior profiles or other criteria may be applied which indicate, based on resource utilization measurements, those instances likely to be executing on behalf of fraudulent users. For example, resource utilization behaviors that demonstrate little or no regard for cost or other incentive structures to limit resource utilization (e.g., by incurring accumulating costs for executing the virtual compute instance at a high rate above a guaranteed baseline of performance, such as above X processor utilization threshold for Y period of time) may indicate that a virtual compute instance may be executed for a fraudulent user.

Control or other external components (e.g., cluster leaders) may monitor for and detect virtual compute instances for which fraud mitigation should be performed. As noted above with regard to FIG. 3, in such cases, other information that would not necessarily be available to a host system may be utilized. For example, account or other information indicative of fraudulent use (e.g., a similar usage pattern on other virtual compute instances executing on other host systems, account information indicating higher probability of fraud, etc.) may be used to identify a virtual compute instance for fraud mitigation.

As indicated at 720, availability of hardware resource(s) of the host system may be modified during subsequent execution of the virtual compute instance at the host system, in some embodiments. The hardware resource(s) may remain available to other virtual compute instances executing on the host system not identified for fraud mitigation. For example, as discussed above with regard to FIGS. 4-5B, one (or more) types of hardware resources may have availability modified, such as processor availability (e.g., by isolating or pinning a virtual compute instance to a particular processor on a host using a scheduler policy), memory availability (e.g., by modifying a control group to add boundaries or change memory allocation), and/or network bandwidth availability (e.g., by modifying a control group to add boundaries or change network bandwidth allocation). In some embodiments, the availability of resources for multiple instances identified for fraud mitigation may grouped together (e.g., where fraudulent resources are pinned to the same processor or in the same control group). In some embodiments, different fraud mitigation escalations may be performed according to a scale of mitigation strength (e.g., reducing one, then two, then three types of hardware, and/or reducing the amount of available hardware). Position on the mitigation strength scale may be determined using a confidence value for identifying a virtual compute instance for fraud (e.g., where less confident instances have weaker mitigation applied and more confident instances have stronger mitigation applied).

In some embodiments, further information (e.g., payment or other performance or utilization information) may indicate that the virtual compute instance is not being executed for fraudulent use. In such scenarios, fraud mitigation may be removed. For example, as indicated at 730, a determination may be made to remove fraud information for the virtual compute instance. For example, a control plane, which may have insight into payment or other virtual compute instance behavior executed on behalf of a same user or account at other host systems may indicate a low or no probability of fraudulent use. The control plane may send an indication to the host system to remove the fraud mitigation for the virtual compute instance. Similarly, fraud detection at a host system may determine that a virtual compute instance's resource utilization no longer fits the pattern, profile, or other criteria indicating likely fraudulent use and may make the determination to remove fraud mitigation for the virtual compute instance.

As indicated at 740, availability of the hardware resource (s) of the host system may be returned to the virtual compute instance, in some embodiments. For example, corresponding updates to undo availability limitations may be made to scheduling policies or control groups.

Figure 8:
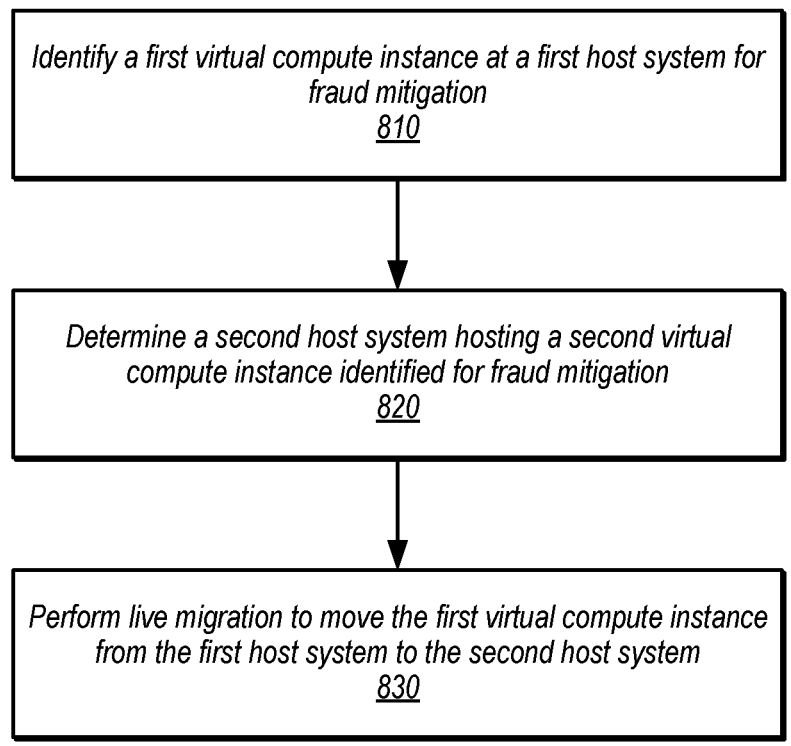
FIG. 8 is a high-level flowchart illustrating techniques and methods to implement migrating instances for fraud mitigation, according to some embodiments.

As discussed above, in some scenarios a fleet or service-wide view of fraud mitigation may allow for large scale fraud mitigation techniques to be implemented. FIG. 8 is a high-level flowchart illustrating techniques and methods to implement migrating instances for fraud mitigation, according to some embodiments. As indicated at 810, a first virtual compute instance at a first host system may be identified for fraud mitigation, in some embodiments. Similar to the discussion above with regard to FIG. 7, fraud mitigation identification may occur at a control plane or at the first host system itself.

As indicated at 820, a second host system hosting a second virtual compute instance identified for fraud mitigation may be determined, in some embodiments. For example, control plane status information that describes instances, including various health or other performance information may also indicate that an instance may be identified for fraud mitigation may be maintained. When a virtual compute instance is identified for fraud mitigation, a check may be made as to whether another virtual compute instance at the same host system (e.g., first host system) has any other virtual compute instances for fraud mitigation. If not, then the virtual compute instance may be a candidate for migration to the second host system in order to co-locate and thus better manage costs associated with fraud mitigation by grouping instances under fraud mitigation together. If so, then the virtual compute instance may remain at the first host system.

As indicated at 830, live migration may be performed to move the first virtual compute instance from the first host system to the second host system, in some embodiments. Live migration may utilize various data transfer techniques, including various memory data, including application state (e.g., processor/thread stage) so that when the location of the first virtual compute instance switches to the second host system, any downtime will be imperceptible to a user of the first virtual instance as execution of the first virtual compute instance will continue, thus appearing as the instance were always "live" during the migration. In other embodiments, other migration techniques may be implemented (e.g., non-live migration) to co-locate the first virtual compute instance to the second host system, as long as those migration techniques do not violate a terms of service or other service level agreement enforced for the first virtual compute instance.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement a provider network described herein). The various methods as illustrated in the figures and described herein represent example embodiments of methods. The order of any method may be changed, and various elements may be added, reordered, combined, omitted, modified, etc.

Figure 9:
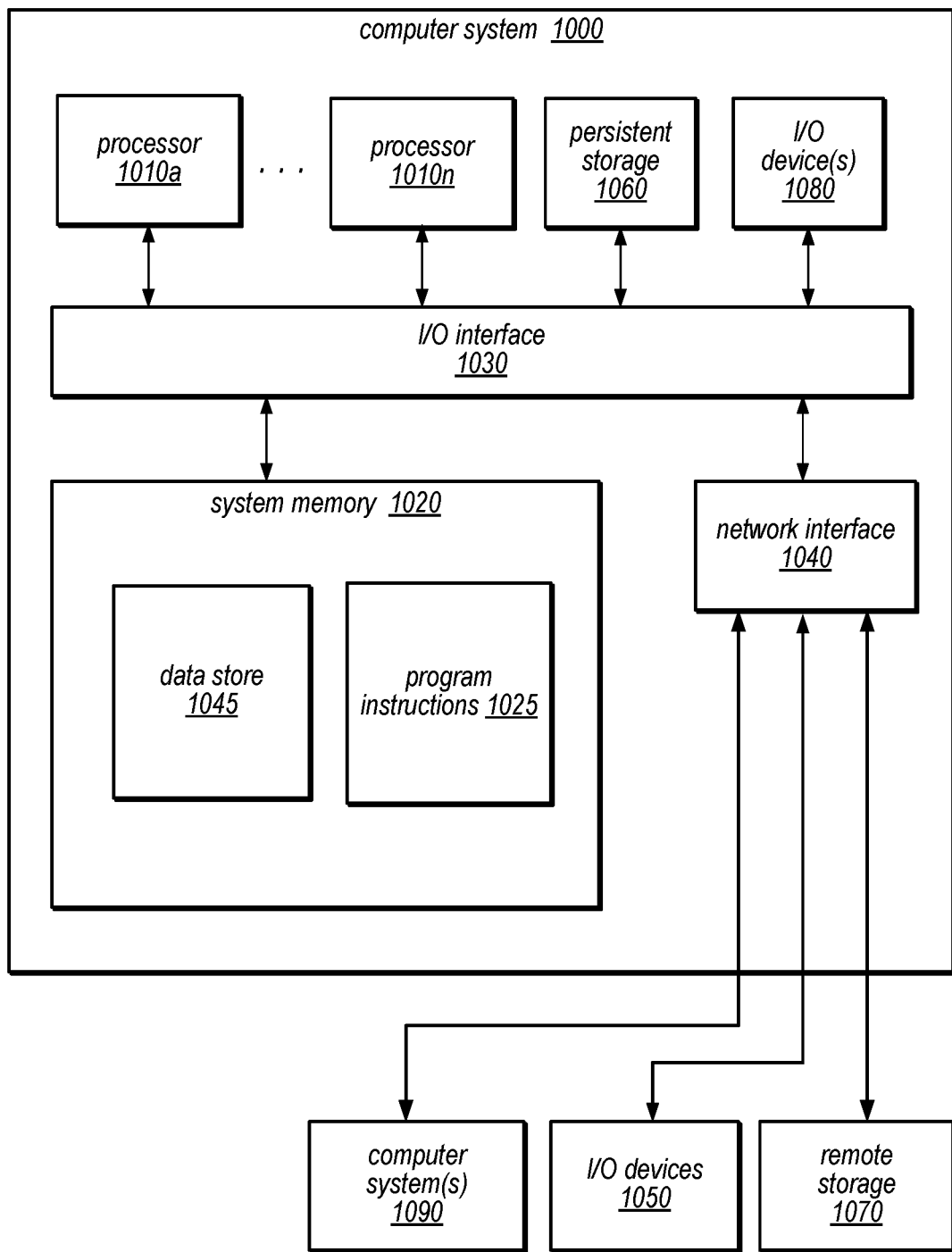
FIG. 9 is a block diagram illustrating an example computing system, according to some embodiments.

Identifying hosts for isolating resources for potentially fraudulent virtual compute instances as described herein may be executed on one or more computer systems, which may interact with various other devices. FIG. 9 is a block diagram illustrating an example computer system, according to various embodiments. For example, computer system 1000 may be configured to implement nodes of a compute cluster, a distributed key value data store, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the provider network described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein, such as techniques for isolating resources for potentially fraudulent virtual compute instances. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a provider network, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A host system configured to host a plurality of virtual compute instances, comprising:
   at least one processor; and
   a memory, storing program instructions that when executed by the at least one processor, cause the at least one processor to:
   monitor resource utilization of the plurality of virtual compute instances at the host system for potential fraudulent behavior;
   based on the monitoring, identify one of the plurality of virtual compute instances for fraud mitigation; and
   responsive to the identification of the one virtual compute instance for fraud mitigation:
      isolate the one virtual compute instance to a hardware resource of the host system while still providing a guaranteed performance for the one virtual compute instance at least until further information indicates that the one virtual compute instance is not being executed for fraudulent use, wherein one or more other hardware resources remain available to other ones of the plurality of virtual compute instances not identified for fraud mitigation; and
      cause one or more subsequent evaluations of further resource utilization of the one virtual compute instance to determine whether identification of the one virtual compute instance for fraud mitigation is mistaken, wherein a result of the one or more subsequent evaluations causes removal of fraud mitigation for the one virtual compute instance.

2. The system of claim 1, wherein the host system is further configured to:
   based on the monitoring, identify a second one of the plurality of virtual compute instances for fraud mitigation;
   responsive to the identification of the second virtual compute instance for fraud mitigation, isolate the second virtual compute instance to the hardware resource of the host system.

3. The system of claim 1, wherein the hardware resource is one of the at least processor of the host system.

4. The system of claim 1, wherein the host system is implemented as part of a virtual computing service implemented as part of a provider network.

5. A method, comprising:
   identifying, at a host system, a virtual compute instance executing on the host system for fraud mitigation based, at least in part, on resource utilization of the virtual compute instance at the host system; and
   responsive to identifying the virtual compute instance for fraud mitigation:
      modifying, by the host system, availability of one or more hardware resources of the host system to the virtual compute instance during subsequent execution of the virtual compute instance on the host system while still providing a guaranteed performance for the virtual compute instance at least until further information indicates that the virtual compute instance is not being executed for fraudulent use, wherein the one or more hardware resources remain available to one or more other virtual compute instances executing on the host system not identified for fraud mitigation; and
      performing one or more subsequent evaluations of further resource utilization of the virtual compute instance to determine whether identification of the virtual compute instance for fraud mitigation is mistaken, wherein a result of the one or more subsequent evaluations causes removal of fraud mitigation for the virtual compute instance.

6. The method of claim 5, wherein modifying the availability of the one or more hardware resources of the host system to the virtual compute instance comprises isolating the virtual compute instance to a processor of the host system.

7. The method of claim 5, wherein modifying the availability of the one or more hardware resources of the host system to the virtual compute instance comprises limiting an amount of memory of the host system that is available to the virtual compute instance.

8. The method of claim 5, wherein identifying the virtual compute instance executing on the host system for fraud mitigation comprises receiving an indication from a control plane for a network-based service that hosts the virtual compute instance at the host system that identifies the virtual compute instance for fraud mitigation.

9. The method of claim 5, wherein identifying the virtual compute instance executing on the host system for fraud mitigation is performed as part of monitoring by the host system the virtual compute instance and the one or more other virtual compute instances.

10. The method of claim 5, wherein the virtual compute instance was migrated to the host system from a different host system and wherein a second virtual compute instance identified for fraud mitigation is migrated to the host system from a different host system.

11. The method of claim 10, further comprising:
receiving, at a control plane for the host system and a plurality of other host systems for virtual compute instances, a request to launch a second virtual compute instance;
identifying, by the control plane, the second virtual compute instance for fraud mitigation; and
directing, by the control plane, the second virtual compute instance to be deployed at the host system, wherein the host system makes a same modification of the availability of the one or more hardware resources of the host system to the second virtual compute instance as was made for the virtual compute instance.

12. The method of claim 5, further comprising:
returning availability of the one or more hardware resources of the host system to the virtual compute instance.

13. The method of claim 5, further comprising:
identifying, at the host system, a second virtual compute instance executing on the host system for fraud mitigation based, at least in part, on resource utilization of the second virtual compute instance at the host system; and
responsive to identifying the second virtual compute instance for fraud mitigation, making a same modification, by the host system, of the availability of the one or more hardware resources of the host system to the second virtual compute instance as was made for the virtual compute instance, wherein the one or more hardware resources remain available to the one or more other virtual compute instances executing on the host system not identified for fraud mitigation.

14. One or more non-transitory, computer-readable storage media, storing program instructions that when executed on or across one or more computing devices cause the one or more computing devices to implement:
detecting a virtual compute instance executing on a host system for fraud mitigation based, at least in part, on resource utilization of the virtual compute instance at the host system; and
responsive to detecting the virtual compute instance for fraud mitigation:

causing, by the host system, availability of one or more hardware resources of the host system to the virtual compute instance to be modified during subsequent execution of the virtual compute instance on the host system while still providing a guaranteed performance for the virtual compute instance at least until further information indicates that the virtual compute instance is not being executed for fraudulent use, wherein the one or more hardware resources remain available to one or more other virtual compute instances executing on the host system not identified for fraud mitigation; and
causing one or more subsequent evaluations of further resource utilization of the virtual compute instance to determine whether identification of the virtual compute instance for fraud mitigation is mistaken, wherein a result of the one or more subsequent evaluations causes removal of fraud mitigation for the virtual compute instance.

15. The one or more non-transitory, computer-readable storage media of claim 14, wherein, in modifying the availability of the one or more hardware resources of the host system to the virtual compute instance, the program instructions cause the one or more computing devices to implement limiting an amount of network bandwidth of the host system that is available to the virtual compute instance.

16. The one or more non-transitory, computer-readable storage media of claim 14, wherein, in modifying the availability of the one or more hardware resources of the host system to the virtual compute instance, the program instructions cause the one or more computing devices to implement isolating the virtual compute instance to a processor of the host system.

17. The one or more non-transitory, computer-readable storage media of claim 14, wherein, in detecting the virtual compute instance executing on the host system for fraud mitigation, the program instructions cause the one or more computing devices to implement receiving an indication from a control plane for a network-based service that hosts the virtual compute instance at the host system that identifies the virtual compute instance for fraud mitigation.

18. The one or more non-transitory, computer-readable storage media of claim 14, storing further program instructions cause the one or more computing devices to further implement:
returning availability of the one or more hardware resources of the host system to the virtual compute instance.

19. The one or more non-transitory, computer-readable storage media of claim 14, storing further program instructions that cause the one or more computing devices to further implement:
identifying, at the host system, a second virtual compute instance executing on the host system for fraud mitigation based, at least in part, on resource utilization of the second virtual compute instance at the host system; and
responsive to identifying the second virtual compute instance for fraud mitigation, causing a same modification, by the host system, of the availability of the one or more hardware resources of the host system to the second virtual compute instance as was made for the virtual compute instance, wherein the one or more hardware resources remain available to the one or more other virtual compute instances executing on the host system not identified for fraud mitigation.

20. The one or more non-transitory, computer-readable storage media of claim 14, wherein the host system is implemented as part of a virtual computing service implemented as part of a provider network.

* * * * *